United States Patent [19]
Lynch

[11] 3,991,893
[45] Nov. 16, 1976

[54] COIL LIFTING APPARATUS AND METHOD

[76] Inventor: Jack M. Lynch, 8360 S. 13th St., Oak Creek, Wis. 53154

[22] Filed: July 24, 1975

[21] Appl. No.: 598,596

Related U.S. Application Data

[62] Division of Ser. No. 471,227, May 20, 1974, Pat. No. 3,930,585.

[52] U.S. Cl. .............................. 214/152; 214/8.5 B; 214/620
[51] Int. Cl.² ...................... B65G 59/02; B66F 9/18
[58] Field of Search .......... 214/8.5 B, 8.5 C, 8.5 SS, 214/620, 621, 130 C, 152, 750, DIG. 1, DIG. 3, DIG. 4, 650; 294/67 A, 82 R

[56]  References Cited
UNITED STATES PATENTS

| | | | |
|---|---|---|---|
| 2,600,538 | 4/1976 | Jackes et al. | 294/82 R |
| 2,680,644 | 6/1954 | Marconi | 294/82 R |
| 3,019,929 | 2/1962 | Gardner et al. | 214/620 |
| 3,050,206 | 8/1962 | McCracken | 214/620 |
| 3,476,360 | 11/1969 | Renfroe | 214/8.5 SS |

FOREIGN PATENTS OR APPLICATIONS 93,820   12/1938   Sweden .......................... 214/8.5 B Primary Examiner—L. J. Paperner
Attorney, Agent, or Firm—Quarles & Brady

[57] ABSTRACT

Apparatus and method for lifting the top coil from a stack of coils. The apparatus includes a housing which is to be attached to the forks of the fork lift truck and a hook suspended from the housing wherein the hook is adapted to facilitate removal of a coil from a stack and its subsequent transport. The method involves the steps of offsetting a top coil from a stack of coils so as to position a portion of its inner core to overhang the cores of the remaining coils in the stack, and thereafter engaging such overhanging portion of the top coil to lift it from the stack and transport it to a desired location.

2 Claims, 9 Drawing Figures

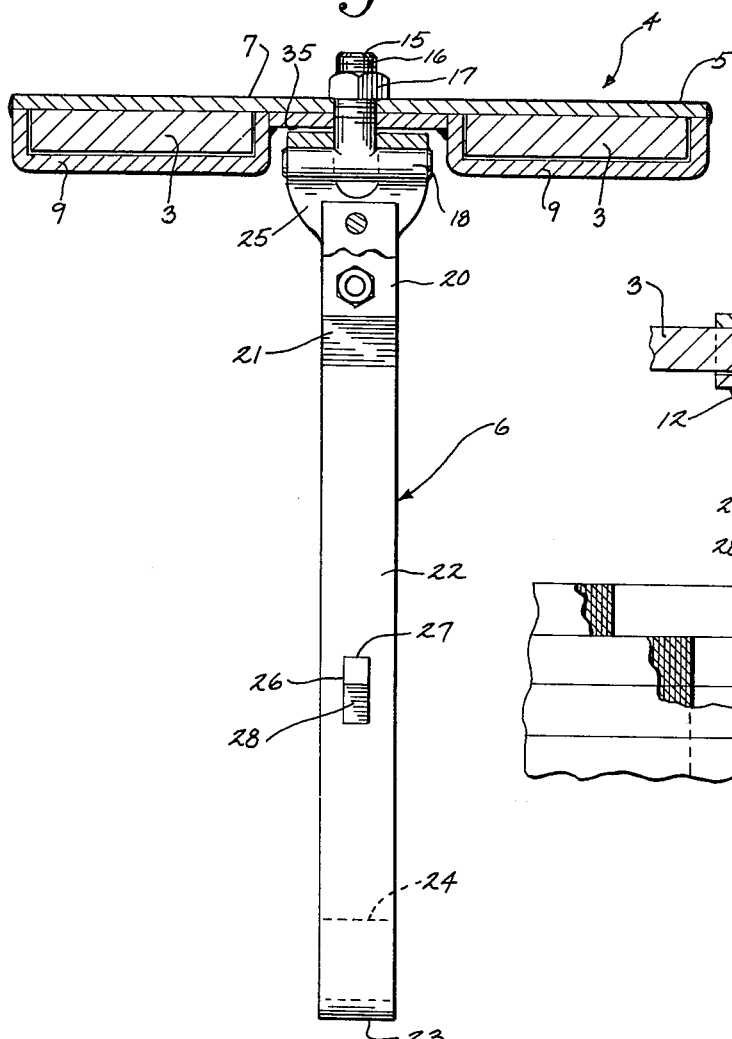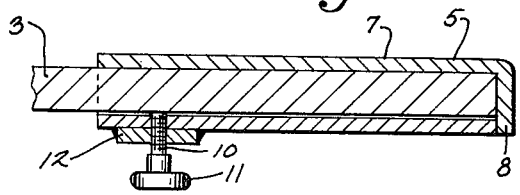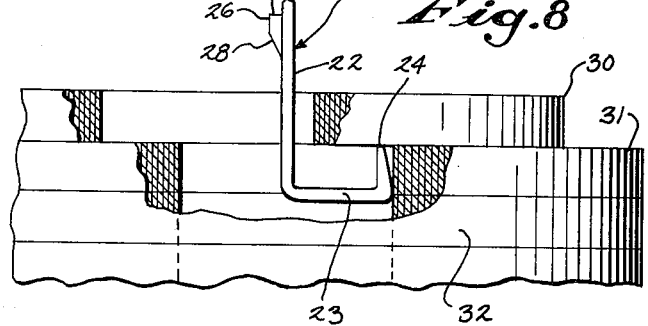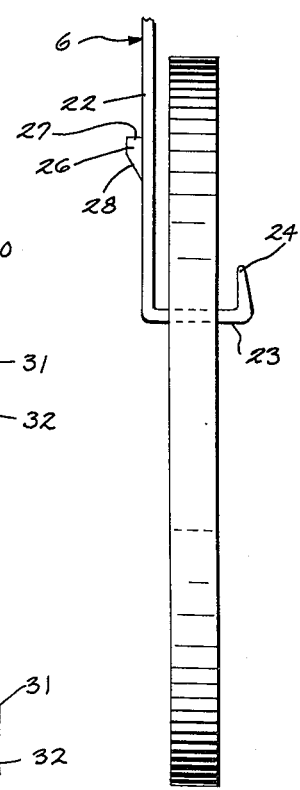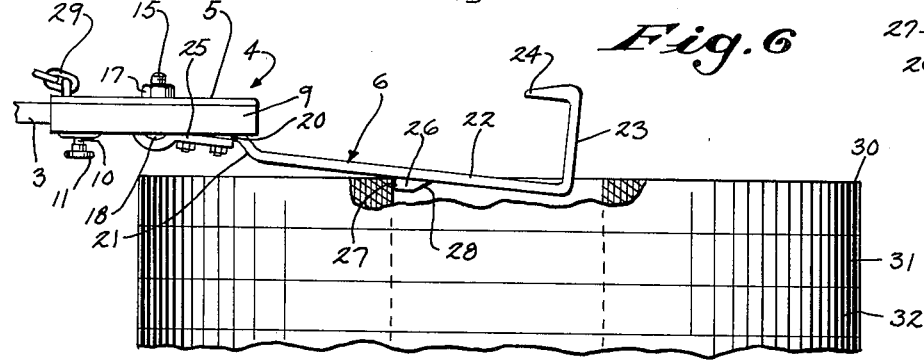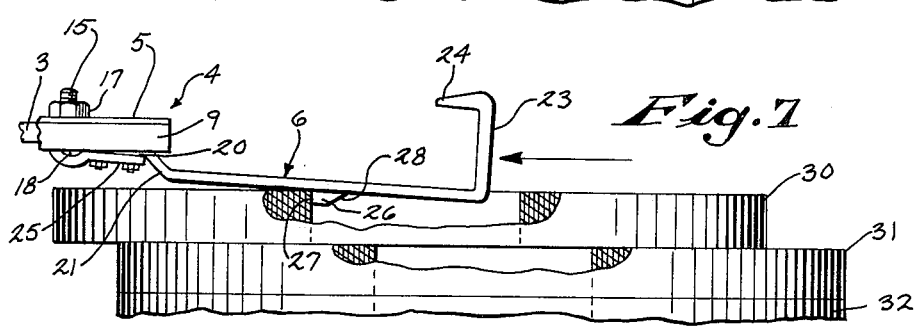

COIL LIFTING APPARATUS AND METHOD

CROSS-REFERENCE TO RELATED APPLICATION

This application is a division of my application Ser. No. 471,227, filed May 20, 1974, now U.S. Pat. No. 3,930,585.

BACKGROUND OF THE INVENTION

1. Field

The present invention relates to the art of lifting a coil from a stack of coils and transporting it without relying upon manual lifting of the coil.

2. Description of the Prior Art

Many elongate materials such as steep strip, aluminum strip and other metals are wound into the form of a coil having a central hollow core. Such coils may often weigh from 100–1200 lbs., or more. After the coils are manufactured by the rolling mill, they are typically stored in stacked fashion with one coil laid upon the other, and superimposed with their central cores substantially aligned with each other. A stack of coils can be transported to the user on a pallet or other suitable transport platform. The user is then confronted with the problem of lifting one coil at a time off the stack so that he can transport it to a suitable holder or other device for feeding the coil into a machine in which the strip is to be processed.

The typical prior art methods for lifting a coil from a stack of coils are in some respects primitive or dangerous, but in any event not particularly satisfactory. It is common for a workman to manually lift a coil from its flat horizontal or stacked position to a vertical position in order to lift it onto the forks of a fork lift truck. If the coil is heavy, two men may be necessary for this work. There is great danger of crushed fingers or toes if a coil should slip during such manual handling, but the method is practiced on a suprisingly large scale in many factories. Another solution is to stack the coils with wedges or spacers between adjacent coils so that the forks of a fork lift truck can be driven into the space between coils in order to lift the uppermost coil. However, this is unsatisfactory because of the problems of coils slipping from the stack due to their separated fashion, either in transport or in storage, so that this method has not enjoyed particularly wide use. Other prior art methods may utilize attaching a handle or other tool to a coil to attempt to facilitate the problem of lifting a coil onto a fork lift truck.

The general unsuitability of the prior art methods heretofore practiced have resulted in the removal of a coil of strip steel, for example, from a stack of coils being a dangerous and time consuming operation because of the great amount of manual labor involved in it. The present invention in both its method and apparatus aspects seeks to abate these problems.

SUMMARY OF THE INVENTION

My present invention provides an apparatus which can be installed on a fork lift truck that will facilitate the unloading of coils from a stack and enables a single operator using a fork lift truck to lift a coil from a stack and transport it to a desired location without manually handling the coil. In its presently-preferred embodiment described hereinafter, the apparatus includes a housing which is to be attached to the forks of a fork lift truck, and a hook suspended from such housing. The hook includes means to enable a top coil to be engaged and offset from the stack of coils on which it rests. Also, the hook may be structured so as to provide for particularly effective transportation of the coil carried thereon, and, in its preferred form, is pivotally suspended from the housing.

My present invention also provides a method for removing the topmost coil from a group of coils stacked with their central core areas generally aligned, in which the first step is to offset the top coil slightly from the balance of the stack so that a portion of its core overhangs the aligned central cores of the underlying coils, then engaging the offset topmost coil along such overhanging portion, and thereafter lifting the offset coil from the stack.

One of the principle objects of my invention is to provide apparatus and methods suitable for removing the top coil of a stack of coils in a safe and efficient manner which will eliminate the need for a workman to manually handle the coil, to thereby increase the safety of a workman involved in handling such coils and also reducing the time involved. Another principle object is to provide apparatus which can be readily installed on the typical fork lift trucks as used in most factories which will enable the facile lifting and transport of a coil from a stack of coils. Another main object is to provide an apparatus including a housing particularly adapted for attachment to the forks of a fork lift truck and from which a hook is supported for engaging a coil and removing it from a stack. Still another main object is to provide a hook construction which will particularly lend itself to the practice of a method where a top coil of a stack is to be offset from the balance of the stack and subsequently removed. A still further main object is to provide a hook construction in an apparatus of the type described which is specifically adapted to hold a coil in a manner which will facilitate its safe transport. A more specific object is to provide the particular details of apparatus and method as here and after claimed.

DESCRIPTION OF THE DRAWINGS

The following description of this invention is made with reference to the accompanying drawings which illustrate presently preferred embodiments of the invention in sufficient detail to enable its practice by those of ordinary skill in the art. In the drawings:

FIG. 4 is a front sectional view taken along the plane of line 4—4 of FIG. 1;

FIG. 5 is a sectional view of a portion of the apparatus taken along the plane of line 5—5 of FIG. 2;

FIG. 6 is a diagrammatic sketch showing the first step in the operation of a coil lifting apparatus of the present invention;

FIG. 7 is a diagrammatic view showing an intermediate step of the use of the present apparatus;

FIG. 8 is a diagrammatic sketch of a later step in the use of the apparatus mentioned; and FIG. 9 shows the apparatus of the present invention holding a coil.

DESCRIPTION OF THE PREFERRED EMBODIMENTS

Figure 1:
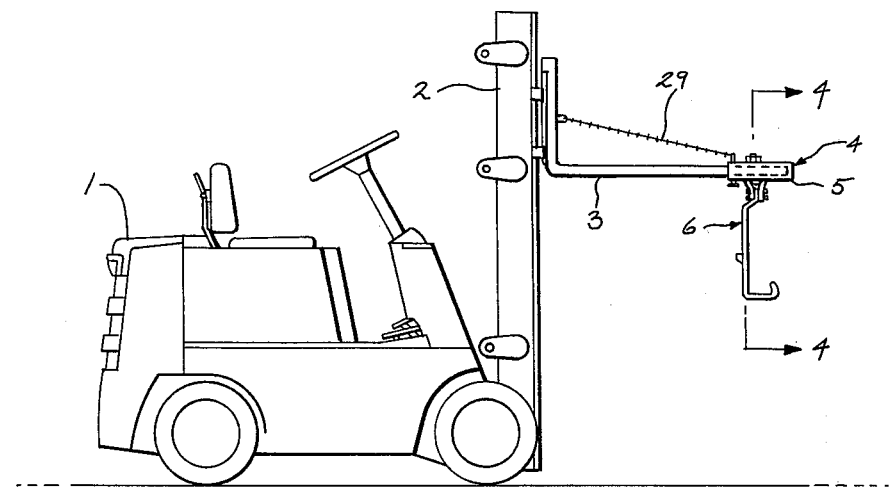
FIG. 1 is a side view of a fork lift truck to which is attached a coil lifting apparatus of the present invention.
Figure 2:
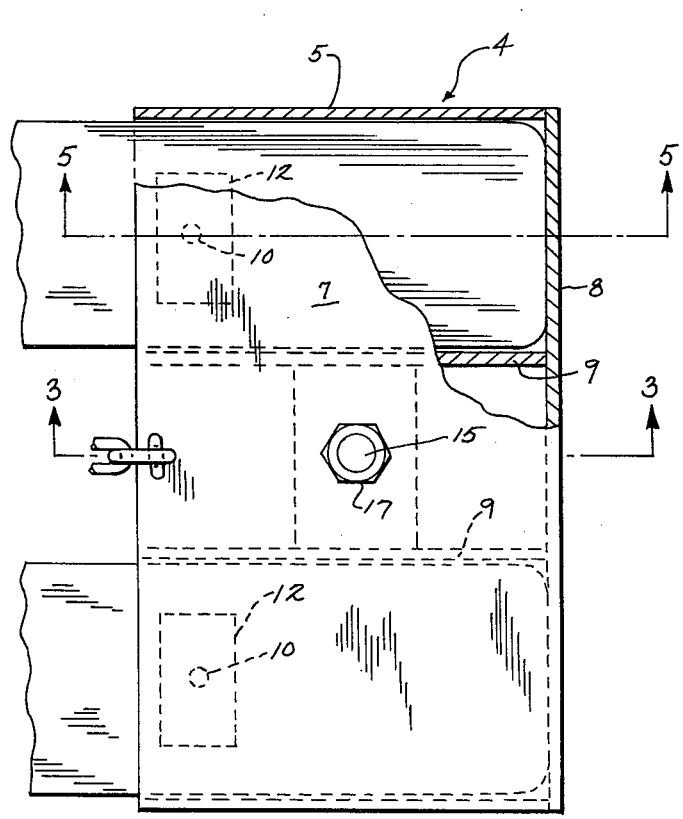
FIG. 2 is a top view, with a portion broken away, of part of the fork lift truck illustrated in FIG. 1.

FIG. 1 illustrates a typical fork lift truck 1 having a vertical mast on which is supported a pair of forks 3 that are actuated in the usual manner to lift and transport various items. The present invention relates to a coil lifting apparatus 4 which is attached to the forks 3 of the truck. In the described embodiment, lifting apparatus 4 includes a housing 5 which is attached to the forks and a hook means 6 which is suspended from the housing.

Turning now to the views of FIGS. 2–5, the housing 5 of the coil lifting apparatus includes a top plate 7 and an end-wall 8; a pair of spaced channels 9 are attached to the underside of the top plate. Each channel 9 is a U-shaped member, and each accommodates a fork 3 associated with the fork lift truck 1 in the manner best shown in FIGS. 2 and 5 wherein the housing slips onto the forks 3 with the ends of the forks abutting the end wall 8. Referring now to FIG. 4, a set screw 10 is threaded through each channel 9 and includes a handle 11, with the set screws being tightened firmly against the bottom of the forks in order to attach the housing to the forks. The set screws 10 may extend through a reinforcing pad 12 secured to the underside of each channel for additional strength if needed. The housing 5 may be formed of members stamped to the appropriate shape and welded together, although other manufacturing techniques may be employed.

Attached to the center of the housing 5 is a vertical post 15 which has a central threaded portion 16 for connection to the housing as by means of a nut 17. The opposite portion of the post 15 includes a laterally extending bar 18 which extends beyond both sides of the post to form a T-shaped pivot member.

Figure 3:
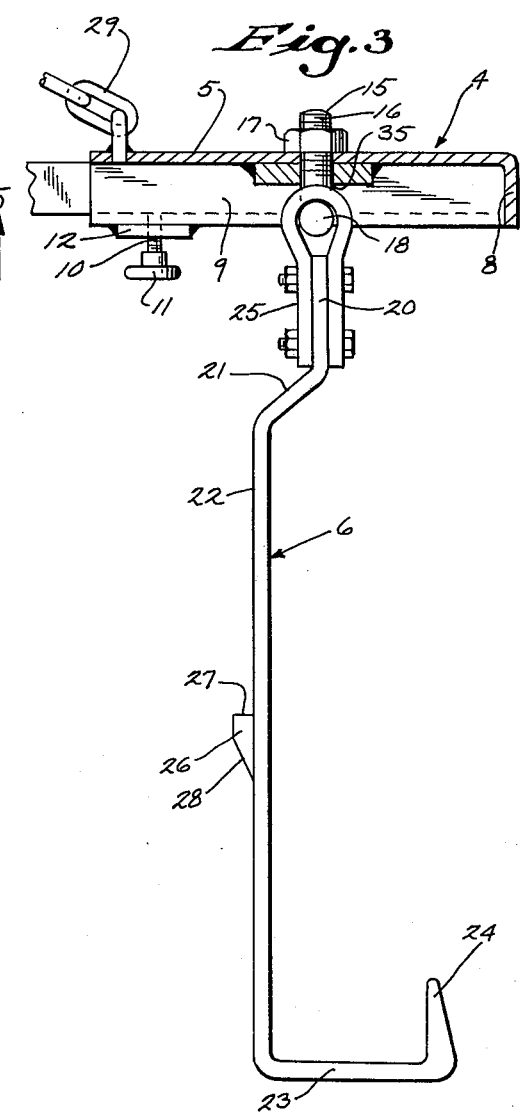
FIG. 3 is a vertical sectional view taken along the plane of line 3—3 of FIG. 2.

Turning now to FIG. 3, the hook 6 has a generally C-shaped configuration which includes an upper vertical portion 20 connected to a sloping portion 21, and long main portion 22 which is an offset from the vertical portion 20. At the lower end of the hook, a coil holding portion 23 is attached to the long main portion 22 of the hook and extends horizontally therefrom so that its outer end is on the opposite side of portion 20 from the main portion 22. A vertical lip 24 extends upwardly from the outer end of holding portion 23. The holding portion 23 should be wide enough to accommodate the widest coil expected to be handled by the lifting apparatus and the main portion 22 is just larger than the diameter of the largest coil to be handled. This configuration allows control over the capacity of the apparatus since one can make the coil holding portion 23 of such width that only coils up to a maximum size can be retained on the hook. The present construction also enables the center of gravity of a coil carried on the holding portion 23 to be approximately aligned with the centerline of the hook 6, thereby enhancing the stability of the lifting apparatus.

A strap 25 is attached to the upper vertical portion 20 of the hook 6 and is employed to pivotally suspend the hook from the vertical post 15 attached to the housing 5. As best seen in FIG. 4, the strap 25 is bifurcated to have arms which extend about each portion of the lateral bar 18 of the post 15. In this fashion, the hook 6 is suspended from the housing 5 so as to be pivotable in a vertical plane perpendicular to the mast 2 of the fork lift truck. This pivotal structure is also effective to limit sideways twisting of the hook and, therefor, a coil carried on the hook. There is a space 35 of about 1/16 inch between the upper edge of the strap 25 and the bottom of the housing 5, best shown in FIG. 4. When the forks of the truck are tilted upwards slightly, as may often occur, twisting of the hook 6 will result in part of the strap 25 contacting the bottom of the housing, to thereby stop the twisting movement and straighten the hook. The 1/16 inch space 35 will limit twisting to about 15°–20°, and thus aid in holding a coil carried on the hook in a generally perpendicular position relative to the forks.

Attached to the rear of the long main portion 22 of the hook 6, or the side opposite from the coil holding portion 23, is a finger 26 that includes a flat rear portion 27 and a sloping nose 28 which slopes toward the portion 23.

A safety chain 29, shown in FIG. 1, which extends from the rear of the housing 5 of the lifting apparatus back to the mast, is attached to the lifting frame of the forks 3. The safety chain is installed to prevent the housing 5 from accidentally slipping off of the front end of the forks of the truck. As shown best in FIG. 2, when the housing 5 is attached to the forks 3 of the truck, the outer ends of the forks abut the inner surface of the end wall 8, and the clamping means or set screws 10 are tightened when the housing is in such position. This prevents the housing from sliding back along the forks towards the mast of the truck, which could occur if the clamping means should loosen. At the same time, the end wall structure enables the housing to be attached to the front of the forks to thereby allow the forks to extend far enough so that the hook can reach over a coil into its core for lifting as described below.

The operation of the lifting apparatus will be described with reference to the sequential views shown in FIGS. 6–9. Beginning with FIG. 6, there is shown a stack of coils 30, 31, and 32. The coils may be elongate strips of steel or aluminum or other desired material, rolled into a coil that may typically weigh from 100 to over 1200 lbs. each. The strip, in stock widths, is generally 5 inches or less in width and 0.015–0.895 inch thick. A common size of coil for many materials has a 16 inch diameter central core and either a 45 inch or 54 inch outer diameter. The coils are stacked on top of one another for storage with their hollow central cores generally superimposed, and the lifting device of the present invention is intended to facilitate the removal of the top coil of the stack. Turning first to FIG. 6, the fork list is driven into an appropriate position with the hook raised to be above the top of the stack over the hollow cores of the coils. The operator then lowers the forks and when the hook 6 contacts the top coil it will pivot away from the forks until the hook assumes a nearly horizontal position; the operator next backs up the truck so that the rear of finger 26 on the hook engages the inside surface of the core of the top coil 30. The sloping nose of the finger 26 allows it to move across a coil freely without accidentally engaging a strip of the coiled material.

Turning now to FIG. 7, the operator again backs up to his truck to move the lifting apparatus in the direction of the arrow 33, whereupon the engagement of the finger 26 with the top coil offsets the top coil 30 from the balance of the coils in the stack. The operator then stops the truck so that the position of the coil 30 with respect to the stack is as shown in FIG. 7.

Turning now to FIG. 8, the operator next raises the forks of the truck so that the hook 6 becomes approximately vertical. He then lowers the hook into the core of the stack of coils until the lip 24 of the hook engages the offset portion of the top coil 30 along its bottom surface. Once the operator uses the device a few times, it is a relatively easy manner to offset the coil a sufficient amount in the step described in FIG. 7 so that there will be a large enough portion to be engaged by the hook in its vertical position shown in FIG. 8. After the hook is in the position of FIG. 8, the operator will then raise the forks of the truck and thereby lift the top coil 30 off the stack of coils; when the coil clears the stack it is in the position shown in FIG. 9 on the hook 6 of the lifting apparatus. In this condition, the coil 30 is held along the coil holding portion 23 of the hook 6. The lip 24 aids in preventing coil from slipping off the hook, in addition to its function in lifting the coil off the stack as in FIG. 8.

The operator is now ready to drive the fork truck to wherever the coil 30 is to be delivered, which may be another storage area or a holder in which the coil is supported for feeding into any desired machinery such as a stamping press, etc.

With the use of the coil lifting apparatus of the present invention, a single workman is able to lift a coil from a stack of coils without having to physically lift the coil or wedge the coil away from the stack in any manner. Instead, the operator is able to utilize the fork lift mechanism entirely to unload the coil from a stack. The method for unloading a coil as described above is readily learned by an operator and enables the facile lifting and transport of a coil. The method also has an important safety aspect in that it eliminates any need for a workman to be exposed to the danger of a fallen or slipping coil as is the case in typical prior art methods in which a coil is manually lifted onto a fork lift truck or other transport device. The method thus allows one man to easily handle heavy coils, such as large coils of steel or any other material.

It is understood that the embodiment of the invention herein disclosed is intended for purposes of illustration, and not limitation, inasmuch as it is expected that those skilled in the art will be able to devise changes to such embodiment which will remain within the scope of the present invention. Thus, for example, in an appropriate instance, the hook could be rigidly suspended from the housing. Also, the hook can be suspended from the housing so as to face rearwardly, and the front end of the housing can be used to offset the top coil in a stack; however, the illustrated embodiment is safer because there is less danger of an unsafe condition if the clamping means attaching the housing to the forks should loosen.

I claim:
1. A method for removing a coil from a stack of coils, each such coil being a strip of elongate material rolled into a coil with a central core, and the stack comprising a plurality of such coils stacked with their central cores generally aligned with one another, said method comprising the steps of:
   1. offsetting the top coil from the remaining coils in the stack so that it has a portion overhanging the aligned cores of the remaining coils in the stack, and
   2. engaging said overhanging portion of the top coil and lifting said coil from the stack.

2. A method for removing a coil from a stack of coils, each such coil being a strip of elongate material rolled into a coil with a central core, and the stack comprising a plurality of such coils stacked vertically with their central cores generally aligned with one another, said method comprising the steps of:
   1. offsetting the top coil from the remaining coils in the stack by sliding the top coil horizontally across the stack in contact with its underlying coil until the top coil is positioned to have a portion overhanging the aligned cores of the remaining coils in the stack, and
   2. engaging said overhanging portion of the top coil and lifting said coil from the stack.

* * * * *